(12) United States Patent
Ellison et al.

(10) Patent No.: US 9,527,767 B2
(45) Date of Patent: Dec. 27, 2016

(54) ALKALI-FREE PHOSPHOBOROSILICATE GLASS

(71) Applicant: Corning Incorporated, Corning, NY (US)

(72) Inventors: Adam James Ellison, Corning, NY (US); John Christopher Mauro, Corning, NY (US); Natesan Venkataraman, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 63 days.

(21) Appl. No.: 14/267,086

(22) Filed: May 1, 2014

(65) Prior Publication Data
US 2014/0335331 A1 Nov. 13, 2014

Related U.S. Application Data

(60) Provisional application No. 61/821,426, filed on May 9, 2013.

(51) Int. Cl.
| | | |
|---|---|---|
| *C03C 3/097* | (2006.01) | |
| *C03C 3/091* | (2006.01) | |
| *C03B 17/00* | (2006.01) | |
| *B32B 17/00* | (2006.01) | |
| *C03B 17/06* | (2006.01) | |
| *C03B 17/02* | (2006.01) | |
| *B32B 17/06* | (2006.01) | |

(52) U.S. Cl.
CPC .............. *C03C 3/097* (2013.01); *B32B 17/00* (2013.01); *B32B 17/06* (2013.01); *C03B 17/02* (2013.01); *C03B 17/064* (2013.01); *B32B 2457/20* (2013.01); *B32B 2457/208* (2013.01); *Y10T 428/24942* (2015.01)

(58) Field of Classification Search
CPC .......... C03C 3/091; C03C 3/093; C03C 3/097; C03B 17/00; C03B 17/02; C03B 17/064; B32B 12/00; B32B 2457/20; B32B 2457/208
See application file for complete search history.

(56) References Cited

U.S. PATENT DOCUMENTS

| | | | |
|---|---|---|---|
| 4,350,532 A | 9/1982 | Randklev | |
| 7,323,426 B2 | 1/2008 | Aitken | 501/63 |
| 7,323,427 B2 | 1/2008 | Wolff et al. | 501/67 |
| 2002/0151426 A1 * | 10/2002 | Murata | C03C 3/091 501/66 |
| 2007/0190338 A1 * | 8/2007 | Aitken | C03B 17/02 428/432 |
| 2009/0129061 A1 * | 5/2009 | Fechner | C03C 3/091 362/97.2 |
| 2012/0063479 A1 | 3/2012 | Li et al. | 372/40 |
| 2012/0135226 A1 | 5/2012 | Bookbinder et al. | 428/335 |
| 2012/0282450 A1 * | 11/2012 | Kawaguchi | C03C 3/093 428/220 |
| 2014/0049708 A1 * | 2/2014 | Murata | C03C 3/087 349/15 |

FOREIGN PATENT DOCUMENTS

| | | | |
|---|---|---|---|
| JP | 60-36349 | 2/1985 | |
| JP | 6311543 | 1/1988 | |
| JP | 63011543 A * | 1/1988 | |
| JP | 2002-3240 | 1/2002 | |
| JP | 2010215463 A * | 9/2010 | |
| JP | 2003335548 | 11/2014 | |
| SU | 1377250 | 2/1988 | |
| WO | WO 2012147615 A1 * | 11/2012 | C03C 3/087 |

OTHER PUBLICATIONS

John C. Mauro; "Statistics of modifier distributions in mixed network glasses"; The Journal of Chemical Physics 138 (2013); pp. 12A522-1-12A522-8.
Shigeki Morimoto; "Phase separation and crystallization in the system $SiO_2$—$Al_2O_3$—$P_2O_5$—$B_2$—$O_3$—$Na_2O$ glasses"; Journal of Non-Crystalline Solids 352 (2006); pp. 756-760.
PCT/US2014/037043 International Preliminary Report on Patentability Dated Nov. 19, 2015.
PCT/US2014/037043 Search Report dated Aug. 13, 2014.
Orlov A.D., Razrabotka Sostavov i Tekhnologii Tugoplavkikh Elektrovakuumnykh Stekol Volframovoi Gruppy. Thesis. Moskva, 1991.

* cited by examiner

*Primary Examiner* — Elizabeth A Bolden
(74) *Attorney, Agent, or Firm* — John T. Haran

(57) ABSTRACT

Alkali-free phosphoboroaluminosilicate glasses are provided. The glasses include the network formers $SiO_2$, $B_2O_3$, and at least one of $Al_2O_3$ and $P_2O_5$. The glass may, in some embodiments, have a Young's modulus of less than about 78 GPa and/or a coefficient of thermal expansion, averaged over a temperature range from about 20° C. to about 300° C., of less than about $38 \times 10^{-7}/°$ C. The glass may be used as a cover glass for electronic devices or as an outer clad layer for a glass laminate.

52 Claims, 1 Drawing Sheet

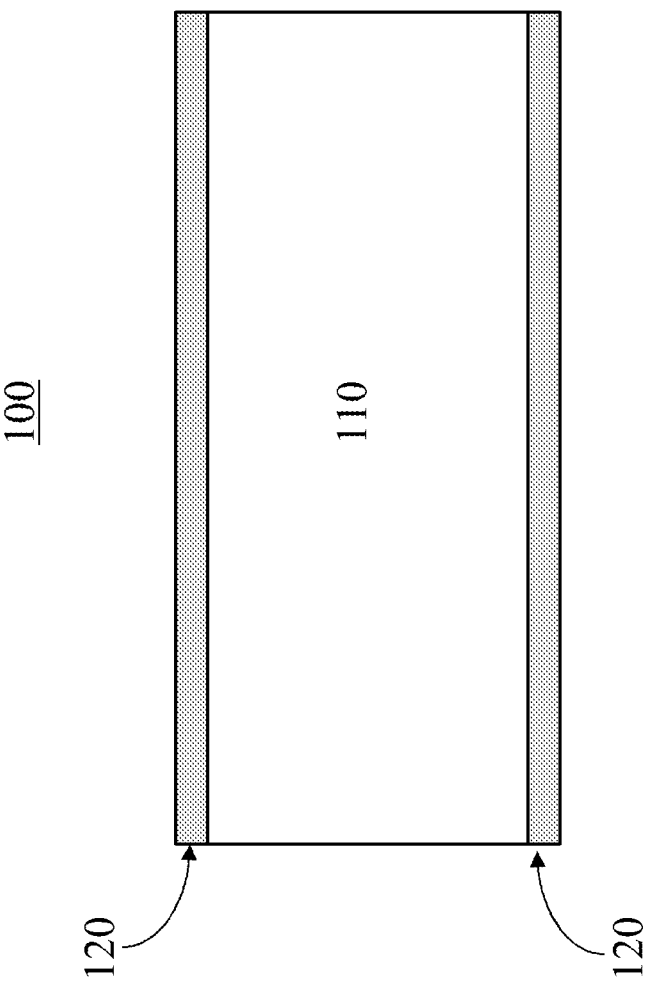

ALKALI-FREE PHOSPHOBOROSILICATE GLASS

This application claims the benefit of priority under 35 U.S.C. §119 of U.S. Provisional Application Ser. No. 61/821,426, filed on May 9, 2013, the content of which is relied upon and incorporated herein by reference in its entirety.

BACKGROUND

The disclosure relates to glasses that do not contain alkali metals or their oxides. More particularly, the disclosure relates to alkali-free glasses that are formable by down-draw processes such as slot-draw and fusion-draw techniques. Even more particularly, the disclosure relates to alkali-free glasses that can be formed into a clad layer for a glass laminate.

SUMMARY

Alkali-free phosphoboroaluminosilicate glasses are provided. The glasses include the network formers $SiO_2$, $B_2O_3$, and at least one of $Al_2O_3$ and $P_2O_5$. The glass may, in some embodiments, have a Young's modulus of less than about 78 GPa and/or a coefficient of thermal expansion, averaged over a temperature range from about 20° C. to about 300° C., of less than about $38 \times 10^{-7}$/° C. The glass may be used as a cover glass for electronic devices or as an outer clad layer for a glass laminate.

Accordingly, one aspect of the disclosure is to provide a glass comprising: from about 50 mol % to about 75 mol % $SiO_2$; from greater than 0 mol % to about 20 mol % $Al_2O_3$; from greater than 0 mol % to about 35 mol % $B_2O_3$; from greater than 0 mol % to about 20 mol % $P_2O_5$; up to about 5 mol % MgO; up to about 10 mol % CaO; up to about 5 mol % SrO; up to about 0.5 mol % $Fe_2O_3$; and up to about 0.1 mol % $ZrO_2$, wherein the glass is substantially free of alkali metal modifiers.

A second aspect of the disclosure is to provide a glass comprising $SiO_2$, $B_2O_3$, $Al_2O_3$, and $P_2O_5$. The glass is substantially free of alkali metal modifiers. and has at least one of a Young's modulus of less than about 78 GPa and a coefficient of thermal expansion, averaged over a temperature range from about 20° C. to about 300° C., of less than about $38 \times 10^{-7}$/° C.

A third aspect of the disclosure is to provide a glass laminate comprising a core glass and a clad glass laminated onto an outer surface of the core glass. The clad glass layer comprises $SiO_2$, $B_2O_3$, $Al_2O_3$, and $P_2O_5$, and is substantially free of alkali metal modifiers. The clad glass has a first coefficient of thermal expansion, averaged over a temperature range from about 20° C. to about 300° C., of less than about $38 \times 10^{-7}$/° C. and the core glass has a second coefficient of thermal expansion, averaged over a temperature range from about 20° C. to about 300° C., that is greater than the first coefficient of thermal expansion.

A fourth aspect of the disclosure is to provide a method of making a glass. The method comprises: providing a glass melt, the glass melt comprising $SiO_2$, $B_2O_3$, and at least one of $Al_2O_3$ and $P_2O_5$, wherein the glass melt is substantially free of alkali metal modifiers; and down-drawing the glass melt to form the glass These and other aspects, advantages, and salient features will become apparent from the following detailed description, the accompanying drawings, and the appended claims.

BRIEF DESCRIPTION OF THE DRAWINGS

FIG. 1 is a schematic cross-section view of a glass laminate.

DETAILED DESCRIPTION

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

As used herein, the terms "glass article" and "glass articles" are used in their broadest sense to include any object made wholly or partly of glass. Unless otherwise specified, all compositions are expressed in terms of mole percent (mol %) and coefficients of thermal expansion (CTE) are expressed in terms of $10^{-7}$/° C.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Referring to the drawings in general and to FIG. 1 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

Described herein are glasses and glass articles made therefrom that comprise the network formers $SiO_2$, $Al_2O_3$, $B_2O_3$, and $P_2O_5$ and are free of alkali metals and alkali metal oxides and have low (i.e., less than about $40 \times 10^{-7}$/° C. when measured over a temperature range from about 20° C. to about 300° C.) coefficients of thermal expansion (CTE). In addition, the amount of alkaline earth oxides is also minimized in order to further reduce the CTE of the glass. In some embodiments, these glasses also have low values of Young's modulus and shear modulus to improve the intrinsic or native damage resistance of the glass.

In some embodiments, the glasses described herein are formable by down-draw processes that are known in the art, such as slot-draw and fusion-draw processes. The fusion draw process is an industrial technique that has been used for the large-scale manufacture of thin glass sheets. Compared to other flat glass manufacturing techniques, such as the float or slot draw processes, the fusion draw process yields thin glass sheets with superior flatness and surface quality. As a result, the fusion draw process has become the dominant manufacturing technique in the fabrication of thin glass substrates for liquid crystal displays, as well as for cover glass for personal electronic devices such as notebooks, entertainment devices, tables, laptops, and the like.

The fusion draw process involves the flow of molten glass over a trough known as an "isopipe," which is typically made of zircon or another refractory material. The molten glass overflows the top of the isopipe from both sides, meeting at the bottom of the isopipe to form a single sheet where only the interior of the final sheet has made direct contact with the isopipe. Since neither exposed surface of the final glass sheet has made contact with the isopipe material during the draw process, both outer surfaces of the glass are of pristine quality and do not require subsequent finishing.

In order to be fusion drawable, a glass must have a sufficiently high liquidus viscosity (i.e., the viscosity of a molten glass at the liquidus temperature). In some embodiments, the glasses described herein have a liquidus viscosity of at least about 150 kilopoise (kpoise). In some embodiments, these glasses have a liquidus viscosity of at least about 300 kpoise.

Traditional fusion draw is accomplished using a single isopipe, resulting in a homogeneous glass product. The more complicated laminate fusion process makes use of two isopipes to form a laminated sheet comprising a core glass composition surrounded on either (or both) side by outer clad layers. One of the main advantages of laminate fusion is that when the coefficient of thermal expansion of the clad glass is less than that of the core glass, the CTE difference results in a compressive stress in the outer clad layer. This compressive stress increases the strength of the final glass product without the need for ion exchange treatment. Unlike ion exchange, this strengthening can be achieved without the use of alkali ions in the glass.

Accordingly, in some embodiments, the alkali-free glasses described herein may be used to form a glass laminate, schematically shown in FIG. 1. Glass laminate 100 comprises a core glass 110 surrounded by a clad glass 120 or "clad layer" formed from the alkali-free glass described herein. The core glass 110 has a CTE that is greater than that of the alkali-free glass in the clad layer 120. The core glass may, in some embodiments, be an alkali aluminosilicate glass. In one non-limiting example, the core glass is an alkali aluminosilicate glass having the composition 66.9 mol % $SiO_2$, 10.1 mol % $Al_2O_3$, 0.58 mol % $B_2O_3$, 7.45 mol % $Na_2O$, 8.39 mol % $K_2O$, 5.78 mol % MgO, 0.58 mol % CaO, 0.2 mol % $SnO_2$, 0.01 mol % $ZrO_2$, and 0.01 mol % $Fe_2O_3$, with a strain point of 572° C., an anneal point of 629° C., a softening point of 888° C., and CTE=$95.5 \times 10^{-7}$/° C.

When employed as a clad glass in a laminated product, the alkali-free glass compositions described herein can provide high compressive stresses to the clad layer. The CTE of alkali-free fusion formable glasses are generally in the range of $30 \times 10^{-7}$/° C. or less. When such a glass is paired with, for example, an alkali aluminosilicate glass (e.g., Gorilla® Glass, manufactured by Corning Incorporated) having a CTE of $90 \times 10^{-7}$/° C., the expected compressive stress in the clad glass can be calculated using the elastic stress equations given below in which subscripts 1 and 2 refer to the core glass and the clad glass, respectively:

$$\sigma_2 = \frac{E_1(e_2 - e_1)}{\left(\frac{E_1}{E_2}(1-v_2)\right) + \left(\frac{2t_2}{t_1}(1-v_1)\right)}$$

and $$\sigma_1 = -\frac{2t_2}{t_1}\sigma_2$$

where E is Young's modulus, v is Poisson's ratio, t is the glass thickness, σ is the stress, and $e_2 - e_1$ is the difference in thermal expansion between the clad glass and the core glass. Using the same elastic modulus and Poisson's ratio for the clad glass and core glass further simplifies the above equations.

To calculate the difference in thermal expansion between the clad glass and core glass, one assumes that the stress sets in below the strain point of the softer glass of the clad and core. The stresses in the clad glass can be estimated using these assumptions and the equations above. For typical display-like glass with a CTE of $30 \times 10^{-7}$/° C. as the clad glass and an alkali aluminosilicate core glass with CTE of $90 \times 10^{-7}$/° C., overall thicknesses in the range of 0.5-1.0 mm and clad glass thickness of 10-100 μm, the compressive stress of the clad glass is estimated to be in a range from about 200 MPa to about 315 MPa. As seen in Table 2 below, several the alkali-free glass samples have coefficients of thermal expansion in the range from about 15 to about $13 \times 10^{-7}$/° C. For these glasses, the compressive stress of the clad glass layer would be in a range from 240 MPa to about 400 MPa.

The alkali-free glasses described herein have especially low coefficients of thermal expansion. In some embodiments, the CTE, which is averaged over a temperature range from about 20° C. to about 300° C., is less than less than $38 \times 10^{-7}$/° C. In other embodiments the CTE of the glass averaged over a temperature range from about 20° C. to about 300° C. is less than about $20 \times 10^{-7}$/° C. When paired with a core glass having a higher CTE, the glasses described herein provide a high level of compressive stress in the clad layers of the final laminated glass product. This increases the strength of the glass laminate product. Room-temperature compressive stresses of at least about 100 MPa and, in some embodiments, at least about 400 MPa are attainable by using the glasses disclosed herein in the clad layer of the laminate.

The alkali-free glasses have values of Young's modulus and shear modulus that are significantly less than those of other commercially available fusion-drawn glasses. In some embodiments, the Young's modulus is less than about 78 gigapascals (GPa), in other embodiments, less than about 70 GPa, and in still other embodiments, less than about 60 GPa. The low elastic moduli provide these glasses with a high level of intrinsic damage resistance.

In some embodiments, these alkali-free glasses have strain points of less than 800° C.

In some embodiments, the glasses described herein consist essentially of or comprise: from about 50 mol % to about 75 mol % $SiO_2$ (i.e., 50 mol %≤$SiO_2$≤75 mol %); from greater than 0 mol % to about 20 mol % $Al_2O_3$ (i.e., 0 mol %<$Al_2O_3$≤20 mol %); from greater than 0 mol % to about 35 mol % $B_2O_3$ (i.e., 0 mol %<$B_2O_3$≤35 mol %); from greater than 0 mol % to about 20 mol % $P_2O_5$ (i.e., 0 mol %<$P_2O_5$≤20 mol %); up to about 5 mol % MgO (i.e., 0 mol %≤MgO≤5 mol %); up to about 10 mol % CaO (i.e., 0 mol %≤CaO≤10 mol %); up to about 5 mol % SrO (i.e., 0 mol %≤SrO≤5 mol %); up to about 0.5 mol % $Fe_2O_3$ (i.e., 0 mol % ≤ $Fe_2O_3$ ≤ 0.5 mol %); up to about 0.1 mol % $ZrO_2$ (i.e., 0 mol % ≤ $ZrO_2$ ≤ 0.1 mol %); and, optionally, at least one fining agent such as $SnO_2$, $CeO_2$, $As_2O_3$, $Sb_2O_5$, $Cl^-$, $F^-$, or the like. The at least one fining agent may, in some embodiments, include up to about 0.7 mol % $SnO_2$ (i.e., 0 mol % ≤ $SnO_2$ ≤ 0.5 mol %); up to about 0.5 mol % $As_2O_3$ (i.e., 0 mol % ≤ $As_2O_3$ ≤ 0.5 mol %); and up to about 0.5 mol % $Sb_2O_3$ (i.e., 0 mol % ≤ $Sb_2O_3$ ≤ 0.5 mol %).

In particular embodiments, the glasses consist essentially of or comprise: from about 55 mol % to about 72 mol % $SiO_2$ (i.e., 55 mol % ≤ $SiO_2$ ≤ 75 mol %); from greater than 0 mol % to about 16 mol % $Al_2O_3$ (i.e., 0 mol % < $Al_2O_3$ ≤ 16 mol %); from about 8 mol % to about 35 mol % $B_2O_3$ (i.e., 8 mol % ≤ $B_2O_3$ ≤ 35 mol %); from about 3 mol % to about 20 mol % $P_2O_5$ (i.e., 3 mol % ≤ $P_2O_5$ ≤ 20 mol %); up to about 5 mol % MgO (i.e., 0 mol % ≤ MgO ≤ 5 mol %); up to about 0.2 mol % CaO (i.e., 0 mol % ≤ CaO ≤ 0.2 mol %); up to about 0.2 mol % SrO (i.e., 0 mol % ≤ SrO ≤ 0.2 mol %); up to about 0.1 mol % $ZrO_2$ (i.e., 0 mol % ≤ $ZrO_2$ ≤ 0.1 mol %). The glass may further include at least one fining agent such as $SnO_2$, $CeO_2$, $As_2O_3$, $Sb_2O_5$, $Cl^-$, $F^-$, or the like. The at least one fining agent may, in some embodiments, include up to about 0.2 mol % $SnO_2$ (i.e., 0 mol % ≤ $SnO_2$ ≤ 0.2 mol %).

In some embodiments, the total amount of MgO, CaO, and SrO in the glasses described herein is less than or equal to about 5 mol %, in other embodiments, less than or equal to about 0.2 mol % and, in particular embodiments, the glass is substantially free of alkaline earth modifiers.

Compositions and of non-limiting examples of these glasses are listed in Tables 1a-d. Properties of examples 1-20 in Tables 1a-d are listed in Table 2. Each of the oxide components of these glasses serves a function. Silica ($SiO_2$) is the primary glass forming oxide, and forms the network backbone for the molten glass. Pure $SiO_2$ has a low CTE and is alkali metal-free. Due to its extremely high melting temperature, however, pure $SiO_2$ is incompatible with the fusion draw process. The viscosity curve is also much too high to match with any core glass in a laminate structure. In some embodiments, the amount of $SiO_2$ in the glasses described herein ranges from about 50 mol % to about 75 mol %. In other embodiments, the $SiO_2$ concentration ranges from about 55 mol % to about 72 mol %.

In addition to silica, three network formers—$Al_2O_3$, $B_2O_3$, and $P_2O_5$—are included in the glasses described herein to achieve stable glass formation, low CTE, low Young's modulus, low shear modulus, and to facilitate melting and forming. By mixing all four of these network formers in appropriate concentrations, it is possible achieve stable bulk glass formation while minimizing the need for network modifiers such as alkali or alkaline earth oxides, which act to increase CTE and modulus. Like $SiO_2$, $Al_2O_3$ contributes to the rigidity to the glass network. Alumina can exist in the glass in either fourfold or fivefold coordination. In some embodiments, the glasses described herein comprise from about 2 mol % to about 20 mol % $Al_2O_3$ and, in particular embodiments, from about 2 mol % to about 16 mol % $Al_2O_3$.

Boron oxide ($B_2O_3$) is also a glass-forming oxide that is used to reduce viscosity and thus improves the ability to melt and form glass. $B_2O_3$ can exist in either threefold or fourfold coordination in the glass network Threefold coordinated $B_2O_3$ is the most effective oxide for reducing the Young's modulus and shear modulus, thus improving the intrinsic damage resistance of the glass. Accordingly, the glasses described herein comprise $B_2O_3$. In some embodiments, the glasses include up to about 35 mol % $B_2O_3$ and, in other embodiments, from about 8 mol % to about 35 mol % $B_2O_3$.

Phosphorous pentoxide ($P_2O_5$) is the fourth network former incorporated in these glasses. $P_2O_5$ adopts a quasi-tetrahedral structure in the glass network; i.e., it is coordinated with four oxygen atoms, but only three of which are connected to the rest of the network. The fourth oxygen is a terminal oxygen that is doubly bound to the phosphorous cation. Association of boron with phosphorus in the glass network can lead to a mutual stabilization of these network formers in tetrahedral configurations, as with $SiO_2$. Like $B_2O_3$, the incorporation of $P_2O_5$ in the glass network is highly effective at reducing Young's modulus and shear modulus. In some embodiments, the glasses described herein comprise from greater than 0 mol % to about 20 mol % $P_2O_5$ and, in other embodiments, from about 3 mol % to about 20 mol % $P_2O_5$.

Alkaline earth oxides (MgO, CaO, and SrO), like $B_2O_3$, also improve the melting behavior of the glass. However, they also act to increase CTE and Young's and shear moduli. In some embodiments, the glasses described herein comprise up to about 5 mol % MgO, up to about 10 mol % CaO, and up to about 5 mol % SrO and, in other embodiments, up to about 5 mol % MgO, up to about 0.2 mol % CaO, and up to about 0.2 mol % SrO. In some embodiments, the total amount of MgO, CaO, and SrO is less than or equal to about 0.2 mol %. In other embodiments, alkaline earth oxides are present only in trace contaminant levels (i.e., ≤100 ppm). In still other embodiments, the glass is substantially free of alkaline earth oxides.

The glass may also include at least one fining agent such as $SnO_2$, $CeO_2$, $As_2O_3$, $Sb_2O_3$, $Cl^-$, $F^-$, or the like in small concentrations to aid in the elimination of gaseous inclusions during melting. In some embodiments, the glass may comprise up to about 0.7 mol % $SnO_2$, up to about 0.5 mol % $As_2O_3$, and/or up to about 0.5 mol % $Sb_2O_3$. In other embodiments, at least one fining agent may comprise up to about 0.2 mol % $SnO_2$.

A small amount of $ZrO_2$ may also be introduced by contact of hot glass with zirconia-based refractory materials in the melter, and thus monitoring its level in the glass may be important to judging the rate of tank wear over time. The glass, may in some embodiments, include up to about 0.1 mol % $ZrO_2$. The glass may further comprise low concentrations of $Fe_2O_3$, as this material is a common impurity in batch materials. In some embodiments, the glass may include up to about 0.5 mol % $Fe_2O_3$.

TABLE 1a

Exemplary compositions of glasses.

| Analyzed (mol %) | 1 | 2 | 3 | 4 | 5 |
|---|---|---|---|---|---|
| $SiO_2$ | 65.62 | 64.75 | 65.63 | 61.14 | 54.54 |
| $Al_2O_3$ | 11.91 | 12.27 | 15.86 | 15.96 | 16.16 |
| $B_2O_3$ | 3.96 | 6.79 | 2.90 | 6.92 | 7.02 |
| $P_2O_5$ | 6.91 | 7.12 | 6.87 | 9.95 | 10.19 |
| MgO | 2.05 | 1.62 | 1.54 | 1.07 | 2.16 |
| CaO | 5.46 | 4.28 | 4.09 | 2.81 | 5.70 |
| SrO | 4.00 | 3.11 | 3.02 | 2.08 | 4.15 |
| $SnO_2$ | 0.07 | 0.07 | 0.07 | 0.07 | 0.07 |

| Analyzed (mol %) | 6 | 7 |
|---|---|---|
| $SiO_2$ | 52.45 | 63.65 |
| $Al_2O_3$ | 18.71 | 15.75 |
| $B_2O_3$ | 10.02 | 0.04 |
| $P_2O_5$ | 9.91 | 6.89 |
| MgO | 1.57 | 2.05 |

TABLE 1a-continued

Exemplary compositions of glasses.

| | | |
|---|---|---|
| CaO | 4.17 | 7.50 |
| SrO | 3.08 | 4.03 |
| $SnO_2$ | 0.07 | 0.06 |

TABLE 1b

Exemplary compositions of glasses.

| Batched (mol %) | 8 | 9 | 10 | 11 | 12 |
|---|---|---|---|---|---|
| $SiO_2$ | 60.74 | 62.89 | 64.45 | 64.47 | 66.60 |
| $Al_2O_3$ | 14.12 | 16.10 | 13.61 | 15.78 | 15.90 |
| $B_2O_3$ | 6.28 | 0.04 | 0.03 | 0.03 | 2.86 |
| $P_2O_5$ | 8.61 | 7.03 | 8.57 | 6.72 | 6.84 |
| MgO | 1.81 | 2.13 | 2.04 | 0.10 | 1.56 |
| CaO | 4.87 | 7.73 | 7.37 | 7.05 | 4.06 |
| SrO | 3.49 | 4.01 | 3.86 | 5.77 | 2.09 |
| $SnO_2$ | 0.06 | 0.05 | 0.05 | 0.06 | 0.06 |
| Batched (mol %) | 13 | 14 | 15 | 16 | 17 |
| $SiO_2$ | 69.41 | 70.01 | 70.08 | 70.52 | 70.69 |
| $Al_2O_3$ | 17.80 | 17.75 | 15.62 | 13.76 | 11.73 |
| $B_2O_3$ | 0.04 | 1.92 | 1.87 | 1.85 | 1.92 |
| $P_2O_5$ | 7.05 | 6.66 | 6.87 | 6.71 | 6.73 |
| MgO | 1.60 | 1.02 | 1.57 | 2.06 | 2.56 |
| CaO | 2.93 | 1.88 | 2.85 | 3.68 | 4.58 |
| SrO | 1.09 | 0.69 | 1.06 | 1.35 | 1.69 |
| $SnO_2$ | 0.06 | 0.06 | 0.06 | 0.07 | 0.06 |

TABLE 1c

Exemplary compositions of glasses.

| Analyzed (mol %) | 18 | 19 | 20 | 21 | 22 |
|---|---|---|---|---|---|
| $SiO_2$ | 69.54 | 69.83 | 69.89 | 70.07 | 70.01 |
| $Al_2O_3$ | 13.66 | 13.70 | 4.00 | 3.84 | 3.89 |
| $B_2O_3$ | 6.82 | 9.43 | 16.15 | 16.15 | 14.27 |
| $P_2O_5$ | 6.84 | 6.88 | 9.83 | 9.90 | 11.79 |
| MgO | 3.00 | 0.05 | 0.03 | 0.00 | 0.00 |
| CaO | 0.05 | 0.03 | 0.03 | 0.00 | 0.00 |
| SrO | 0.00 | 0.00 | 0.00 | 0.00 | 0.00 |
| $SnO_2$ | 0.07 | 0.08 | 0.07 | 0.04 | 0.04 |
| Analyzed (mol %) | | 23 | 24 | 25 | 26 |
| $SiO_2$ | | 69.92 | 71.91 | 70.10 | 66.00 |
| $Al_2O_3$ | | 3.97 | 2.99 | 2.95 | 3.88 |
| $B_2O_3$ | | 18.21 | 16.27 | 18.05 | 20.17 |
| $P_2O_5$ | | 7.87 | 8.79 | 8.86 | 9.91 |
| MgO | | 0.00 | 0.00 | 0.00 | 0.00 |
| CaO | | 0.00 | 0.00 | 0.00 | 0.00 |
| SrO | | 0.00 | 0.00 | 0.00 | 0.00 |
| $SnO_2$ | | 0.03 | 0.03 | 0.03 | 0.04 |

TABLE 1d

Exemplary compositions of glasses.

| Analyzed (mol %) | 27 | 28 | 29 | 30 |
|---|---|---|---|---|
| $SiO_2$ | 70.00 | 65.44 | 65.59 | 61.51 |
| $Al_2O_3$ | 3.92 | 3.79 | 1.92 | 3.79 |
| $B_2O_3$ | 16.06 | 20.85 | 22.81 | 24.78 |
| $P_2O_5$ | 9.88 | 9.83 | 9.57 | 9.83 |

TABLE 1d-continued

Exemplary compositions of glasses.

| | | | | |
|---|---|---|---|---|
| MgO | 0.04 | 0.02 | 0.03 | 0.02 |
| CaO | 0.02 | 0.02 | 0.02 | 0.02 |
| SrO | 0.00 | 0.00 | 0.00 | 0.00 |
| $SnO_2$ | 0.08 | 0.05 | 0.06 | 0.05 |

| Analyzed (mol %) | 31 | 32 | 33 | 34 | 35 |
|---|---|---|---|---|---|
| $SiO_2$ | 67.86 | 64.30 | 62.45 | 60.33 | 58.41 |
| $Al_2O_3$ | 3.80 | 3.81 | 3.83 | 3.83 | 3.85 |
| $B_2O_3$ | 18.39 | 22.05 | 23.76 | 25.86 | 27.71 |
| $P_2O_5$ | 9.88 | 9.78 | 9.89 | 9.91 | 9.95 |
| MgO | 0.00 | 0.00 | 0.00 | 0.00 | 0.00 |
| CaO | 0.00 | 0.00 | 0.00 | 0.00 | 0.00 |
| SrO | 0.00 | 0.00 | 0.00 | 0.00 | 0.00 |
| $SnO_2$ | 0.07 | 0.07 | 0.07 | 0.07 | 0.07 |
| Analyzed (mol %) | 36 | 37 | 38 | 39 | 40 |
| $SiO_2$ | 56.09 | 70.61 | 68.58 | 65.70 | 66.00 |
| $Al_2O_3$ | 3.84 | 0.06 | 2.02 | 3.96 | 3.99 |
| $B_2O_3$ | 29.97 | 14.73 | 14.38 | 14.88 | 14.74 |
| $P_2O_5$ | 10.03 | 14.55 | 14.97 | 15.40 | 15.21 |
| MgO | 0.00 | 0.00 | 0.00 | 0.00 | 0.00 |
| CaO | 0.00 | 0.00 | 0.00 | 0.00 | 0.00 |
| SrO | 0.00 | 0.00 | 0.00 | 0.00 | 0.00 |
| $SnO_2$ | 0.07 | 0.05 | 0.06 | 0.06 | 0.06 |
| Analyzed (mol %) | | 41 | 42 | 43 | 44 |
| $SiO_2$ | | 69.61 | 69.75 | 61.99 | 62.11 |
| $Al_2O_3$ | | 3.92 | 3.93 | 3.95 | 3.96 |
| $B_2O_3$ | | 16.82 | 16.86 | 30.19 | 30.36 |
| $P_2O_5$ | | 9.58 | 9.39 | 3.80 | 3.50 |
| MgO | | 0.00 | 0.00 | 0.00 | 0.00 |
| CaO | | 0.00 | 0.00 | 0.00 | 0.00 |
| SrO | | 0.00 | 0.00 | 0.00 | 0.00 |
| $SnO_2$ | | 0.07 | 0.07 | 0.07 | 0.07 |

TABLE 2

Properties of glasses listed in Tables 1a-d.

| | 1 | 2 | 3 | 4 | 5 |
|---|---|---|---|---|---|
| Anneal Pt. (° C.): | 784.5 | 759.9 | 802.5 | 774.6 | 718.6 |
| Strain Pt. (° C.): | 729.9 | 706.4 | 746.1 | 718.3 | 671.4 |
| Softening Pt. (° C.): | 1155 | 1177.1 | 1061.8 | 1180.8 | |
| Density ($g/cm^3$): | 2.424 | 2.359 | 2.405 | 2.311 | 2.416 |
| CTE ($\times 10^{-7}$/° C.): | 32.7 | 37.5 | 26.9 | | |
| Poisson's Ratio: | 0.215 | 0.224 | 0.210 | 0.214 | 0.216 |
| Shear Modulus (Mpsi): | 4.163 | 3.907 | 4.360 | 3.833 | 3.938 |
| Young's Modulus (Mpsi): | 10.113 | 9.568 | 10.552 | 9.309 | 9.580 |
| Shear Modulus (GPa): | 28.70 | 26.94 | 30.06 | 26.43 | 27.15 |
| Young's Modulus (GPa): | 69.73 | 65.97 | 72.75 | 64.18 | 66.05 |

TABLE 2-continued

Properties of glasses listed in Tables 1a-d.

| | 6 | 7 | 8 | 9 | 10 |
|---|---|---|---|---|---|
| Anneal Pt. (° C.): | 815.1 | 724.5 | 713 | 812 | 793 |
| Strain Pt. (° C.): | 763.9 | 672.8 | 657 | 758 | 740 |
| Softening Pt. (° C.): | 1047.4 | 1040 | N/A | 1050.9 | N/A |
| Density (g/cm$^3$): | 2.368 | 2.497 | 2.421 | 2.499 | 2.474 |
| CTE (×10$^{-7}$/° C.): | | 34.4 | | 34.4 | 35.6 |
| Poisson's Ratio: | 0.225 | 0.231 | 0.236 | 0.218 | 0.218 |
| Shear Modulus (Mpsi): | 4.564 | 3.871 | 3.946 | 4.588 | 4.408 |
| Young's Modulus (Mpsi): | 11.181 | 9.533 | 9.756 | 11.171 | 10.734 |
| Shear Modulus (GPa)): | 31.47 | 26.69 | 27.21 | 31.63 | 30.39 |
| Young's Modulus (GPa): | 77.09 | 65.73 | 67.27 | 77.02 | 74.01 |

| | 11 | 12 | 13 | 14 | 15 |
|---|---|---|---|---|---|
| Anneal Pt. (° C.): | 826 | 801 | 868 | 843 | 834 |
| Strain Pt. (° C.): | 771 | 734 | 799 | 767 | 760 |
| Softening Pt. (° C.): | 1061.8 | 1078.8 | 1146 | 1138.5 | 1129.5 |
| Density (g/cm$^3$): | 2.529 | 2.385 | 2.373 | 2.342 | 2.346 |
| CTE (×10$^{-7}$/° C.): | 37.1 | 24.9 | 18.2 | 15.1 | 18.7 |
| Poisson's Ratio: | 0.218 | 0.216 | 0.212 | 0.222 | 0.219 |
| Shear Modulus (Mpsi): | 4.485 | 4.370 | 4.648 | 4.530 | 4.519 |
| Young's Modulus (Mpsi): | 10.921 | 10.627 | 11.269 | 11.067 | 11.015 |
| Shear Modulus (GPa)): | 30.92 | 30.13 | 32.05 | 31.23 | 31.16 |
| Young's Modulus (GPa): | 75.30 | 73.27 | 77.70 | 76.30 | 75.95 |

| | 16 | 17 | 18 | 19 | 20 |
|---|---|---|---|---|---|
| Anneal Pt. (° C.): | 821 | 796 | 779 | 743 | 611 |
| Strain Pt. (° C.): | 757 | 736 | 707 | 667 | 549 |
| Softening Pt. (° C.): | | | | | 1052.3 |
| Density (g/cm$^3$): | 2.354 | 2.368 | 2.256 | | |
| CTE (×10$^{-7}$/° C.): | 22.5 | 25.7 | 15.7 | 13.7 | 43.7 |
| Poisson's Ratio: | 0.230 | 0.213 | 0.203 | 0.213 | 0.181 |
| Shear Modulus (Mpsi): | 4.354 | 4.312 | 4.044 | 3.761 | 3.369 |
| Young's Modulus (Mpsi): | 10.715 | 10.463 | 9.727 | 9.124 | 7.955 |
| Shear Modulus (GPa)): | 30.02 | 29.73 | 27.88 | 25.93 | 23.23 |
| Young's Modulus (GPa): | 73.88 | 72.14 | 67.07 | 62.91 | 54.85 |

| | 21 | 22 | 23 | 24 | 25 |
|---|---|---|---|---|---|
| Anneal Pt. (° C.): | 634.9 | 656.4 | 584.6 | 625.5 | 612.9 |
| Strain Pt. (° C.): | 558.1 | 587.7 | 492.3 | 549 | 531.8 |
| Softening Pt. (° C.): | 1076.4 | 985.6 | 1023 | 976.2 | 993.6 |
| Density (g/cm$^3$): | 2.202 | 2.241 | 2.185 | 2.196 | 2.196 |
| CTE (×10$^{-7}$/° C.): | 47 | 34.6 | 54.4 | 42.8 | 43 |
| Poisson's Ratio: | 0.19 | 0.21 | 0.22 | 0.19 | 0.22 |
| Shear Modulus (Mpsi): | 3.38 | 3.65 | 3.12 | 3.33 | 3.24 |
| Young's Modulus (Mpsi): | 8.05 | 8.81 | 7.60 | 7.94 | 7.92 |
| Shear Modulus (GPa)): | 23.27 | 25.18 | 21.54 | 22.98 | 22.34 |
| Young's Modulus (GPa): | 55.52 | 60.74 | 52.41 | 54.71 | 54.59 |

| | 26 | 27 | 28 | 29 | 30 |
|---|---|---|---|---|---|
| Anneal Pt. (° C.): | 589.9 | 603 | | | |
| Strain Pt. (° C.): | 508.7 | 556.3 | 640.72 | 643.27 | 604.16 |
| Softening Pt. (° C.): | 1069.8 | 1081 | 1068.7 | 996.4 | 1049.4 |
| Density (g/cm$^3$): | 2.191 | 2.207 | 2.194 | 2.202 | 2.179 |
| CTE (×10$^{-7}$/° C.): | 49.9 | 44.7 | 47.1 | 38.2 | 50.1 |
| Poisson's Ratio: | 0.228 | 0.197 | 0.217 | 0.215 | 0.231 |
| Shear Modulus (Mpsi): | 3.145 | 3.363 | 3.139 | 3.197 | 2.965 |
| Young's Modulus (Mpsi): | 7.746 | 8.05 | 7.642 | 7.769 | 7.297 |
| Shear Modulus (GPa)): | 21.69 | 23.19 | 21.64 | 22.04 | 20.44 |
| Young's Modulus (GPa): | 53.41 | 55.50 | 52.69 | 53.57 | 50.31 |

| | 31 | 32 | 33 | 34 | 35 |
|---|---|---|---|---|---|
| Anneal Pt. (° C.): | | | | | |
| Strain Pt. (° C.): | 656.64 | 626.12 | 596.12 | 581.75 | 546.89 |
| Softening Pt. (° C.): | 1077 | 1056.1 | 1046.9 | 1030.8 | 1015.7 |
| Density (g/cm$^3$): | 2.193 | 2.184 | 2.179 | 2.172 | 2.167 |
| CTE (×10$^{-7}$/° C.): | 45.3 | 46.9 | 49.3 | 51 | 50.6 |
| Poisson's Ratio: | 0.199 | 0.213 | 0.275 | 0.307 | 0.319 |
| Shear Modulus (Mpsi): | 3.243 | 3.024 | 2.937 | 2.856 | 2.795 |

TABLE 2-continued

Properties of glasses listed in Tables 1a-d.

| | | | | | |
|---|---|---|---|---|---|
| Young's Modulus (Mpsi): | 7.779 | 7.339 | 7.488 | 7.465 | 7.372 |
| Shear Modulus (GPa)): | 22.36 | 20.85 | 20.25 | 19.69 | 19.27 |
| Young's Modulus (GPa): | 53.63 | 50.60 | 51.63 | 51.47 | 50.83 |

| | 36 | 37 | 38 | 39 |
|---|---|---|---|---|
| Anneal Pt. (° C.): | | | | |
| Strain Pt. (° C.): | 535.92 | 724.14 | 736.31 | 722.71 |
| Softening Pt. (° C.): | 1014 | 1035.3 | 910.9 | 1093.9 |
| Density (g/cm³): | 2.161 | 2.327 | 2.315 | 2.299 |
| CTE (×10⁻⁷/° C.): | 52.5 | 44.1 | 42.1 | 39.4 |
| Poisson's Ratio: | 0.212 | 0.171 | 0.177 | 0.196 |
| Shear Modulus (Mpsi): | 2.746 | 4.428 | 4.334 | 4.086 |
| Young's Modulus (Mpsi): | 6.655 | 10.372 | 10.201 | 9.771 |
| Shear Modulus (GPa)): | 18.93 | 30.53 | 29.88 | 28.17 |
| Young's Modulus (GPa): | 45.88 | 71.51 | 70.33 | 67.37 |

A method of making the glasses described herein is also provided. the method includes providing a glass melt comprising $SiO_2$, $B_2O_3$, and at least one of $Al_2O_3$ and $P_2O_5$, wherein the glass melt is substantially free of alkali metal modifiers, and down-drawing the glass melt to form the glass. In some embodiments, the step of down-drawing the glass comprises slot-drawing the glass melt and, in other embodiments, fusion-drawing the glass melt.

In certain embodiments, the method further includes providing a core glass melt and fusion drawing the core glass melt to form a core glass having a coefficient of thermal expansion that is less than the coefficient of thermal expansion of the clad glass. The clad glass melt is then fusion drawn to form the clad glass layer, thereby surrounding the core glass. The clad glass layer is under a compressive stress of at least about 400 MPa.

Being substantially free of alkali metals, the glasses described herein are suitable for use in thin film transistor (TFT) display applications. These applications require an alkali-free interface, since the presence of alkali ions poisons the thin film transistors. Thus, ion exchanged alkali-containing glasses are unsuitable for such applications. Glass laminates that employ the alkali-free glasses described herein as a clad layer provide a strengthened glass product combined with an alkali-free interface. In some embodiments, the alkali-free glasses also have high annealing and strain points to reduce thermal compaction, which is desirable for TFT display substrates. The glasses described herein may also be used in color filter transistor substrates, cover glasses, or touch interfaces in various electronic devices.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A glass, the glass comprising: from 50 mol % to 75 mol % $SiO_2$; from greater than 0 mol % to 20 mol % $Al_2O_3$; from greater than 0 mol % to 35 mol % $B_2O_3$; from 3 mol % to 20 mol % $P_2O_5$; up to about 5 mol % MgO; up to 10 mol % CaO; up to 5 mol % SrO; up to 0.5 mol % $Fe_2O_3$; and up to 0.1 mol % $ZrO_2$ wherein:
the glass comprises at least one fining agent, the at least one fining agent comprising at least one of $SnO_2$, $CeO_2$, $Sb_2O_3$, and $Cl^-$; and
the glass is substantially free of alkali metal modifiers.

2. The glass of claim 1, wherein the glass has a Young's modulus of less than 78 GPa.

3. The glass of claim 2, wherein the Young's modulus is less than 60 GPa.

4. The glass of claim 1, wherein the glass has a coefficient of thermal expansion of less than $38 \times 10^{-7}$/° C. averaged over a temperature range from 20° C. to 300° C.

5. The glass of claim 4, wherein the coefficient of thermal expansion is less than $20 \times 10^{-7}$/° C. averaged over a temperature range from 20° C. to 300° C.

6. The glass of Claim 1, wherein the at least one fining agent comprises at least one of up to 0.7 mol % $SnO_2$ and up to 0.5 mol % $Sb_2O_3$.

7. The glass of claim 1, wherein the total amount of MgO, CaO, and SrO in the glass is less than or equal to 0.2 mol %.

8. The glass of claim 1, wherein the glass is substantially free of alkaline earth modifiers.

9. The glass of claim 1, wherein the glass comprises: from 55 mol % to 72 mol % $SiO_2$; from greater than 0 mol % to 16 mol % $Al_2O_3$; from 8 mol % to 35 mol % $B_2O_3$; from 3 mol % to 20 mol % $P_2O_5$; up to 5 mol % MgO; up to 0.2 mol % CaO; up to 0.2 mol % SrO; up to 0.2 mol % $SnO_2$; and up to 0.1 mol % $ZrO_2$.

10. The glass of claim 1, wherein the glass forms a clad layer in a glass laminate comprising a core glass, wherein the core glass has a coefficient of thermal expansion that is greater than a coefficient of thermal expansion of the clad layer.

11. The glass of claim 10, wherein the core glass has a coefficient of thermal expansion that is greater than a coefficient of thermal expansion of the clad layer, and the clad layer is under a compressive stress of at least 100 MPa.

12. The glass of claim 1, wherein the glass forms at least a portion of a color filter, a transistor substrate, a cover glass, a touch interface, or combinations thereof.

13. The glass of claim 1, wherein the glass has a strain point of less than 800° C.

14. The glass of claim 1, wherein the glass has a liquidus viscosity of at least 150 kpoise.

15. The glass of claim 14, wherein the glass is down-drawable.

16. A glass comprising $SiO_2$, $B_2O_3$, $Al_2O_3$, and from 3 mol % to 20 mol % $P_2O_5$, wherein the glass is substantially free of alkali metal modifiers, and wherein:
the glass comprises at least one fining agent, the at least one fining agent comprising at least one of $SnO_2$, $CeO_2$, $Sb_2O_3$, and $Cl^-$;
the glass is substantially free of alkaline earth modifiers; and
the glass has at least one of a Young's modulus of less than 78 GPa and a coefficient of thermal expansion of less than $38 \times 10^{-7}$/° C. averaged over a temperature range from 20° C. to 300° C.

17. The glass of claim 16, wherein the Young's modulus is less than 60 GPa.

18. The glass of claim 16, wherein the coefficient of thermal expansion is less than $20 \times 10^{-7}/°$ C. averaged over a temperature range from 20° C. to 300° C.

19. The glass of claim 16, wherein the glass comprises: from 50 mol % to 75 mol % $SiO_2$; from greater than 0 mol % to 20 mol % $Al_2O_3$; from greater than 0 mol % to 35 mol % $B_2O_3$; from 3 mol % to 20 mol % $P_2O_5$; up to 0.5 mol % $Fe_2O_3$; and up to 0.1 mol % $ZrO_2$.

20. The glass of claim 19, wherein the glass comprises: from 55 mol % to 72 mol % $SiO_2$; from greater than 0 mol % to 16 mol % $Al_2O_3$; from 8 mol % to 35 mol % $B_2O_3$; from 3 mol % to 20 mol % $P_2O_5$; up to 0.2 mol % $SnO_2$; and up to 0.1 mol % $ZrO_2$.

21. The glass of claim 20, wherein the at least one fining agent comprises 0.2 mol % $SnO_2$.

22. The glass of claim 16, wherein the at least one fining agent comprises at least one of up to 0.7 mol % $SnO_2$ and up to 0.5 mol % $Sb_2O_3$.

23. The glass of claim 16, wherein the glass forms a clad layer in a glass laminate comprising a core glass, wherein the core glass has a coefficient of thermal expansion that is greater than a coefficient of thermal expansion of the clad layer.

24. The glass of claim 23, wherein the clad layer is under a compressive stress of at least 100 MPa.

25. The glass of claim 16, wherein the glass forms at least a portion of a color filter transistor substrate, a cover glass, or a touch interface.

26. The glass of claim 16, wherein the glass has a liquidus viscosity of at least 150 kpoise.

27. The glass of claim 26, wherein the glass is down-drawable.

28. The glass of claim 16, wherein the glass has a strain point of less than 800° C.

29. The glass of claim 16, wherein the glass has at least one of a Young's modulus of less than 78 GPa and a coefficient of thermal expansion of less than $20 \times 10^{-7}/°$ C. averaged over a temperature range from 20° C. to 300° C.

30. A glass laminate, the glass laminate comprising a core glass and a clad glass laminated onto an outer surface of the core glass, the clad glass layer comprising from 50 mol % to 75 mol % $SiO_2$, from greater than 0 mol % to 35 mol % $B_2O_3$, from greater than 0 mol % to 20 mol % $Al_2O_3$, and from 3 mol % to 20 mol % $P_2O_5$, wherein:
the clad glass is substantially free of alkali metal modifiers;
the glass comprises at least one fining agent, the at least one fining agent comprising at least one of $SnO_2$, $CeO_2$, $Sb_2O_3$, and $Cl^-$; and
wherein the clad glass has a first coefficient of thermal expansion of less than $38 \times 10^{-7}/°$ C. averaged over a temperature range from 20° C. to 300° C. and the core glass has a second coefficient of thermal expansion that is greater than the first coefficient of thermal expansion.

31. The glass laminate of claim 30, wherein the first coefficient of thermal expansion is less than $20 \times 10^{-7}/°$ C. averaged over a temperature range from 20° C. to 300° C.

32. The glass laminate of claim 30, wherein the clad glass further comprises: up to 0.5 mol % $Fe_2O_3$; and up to 0.1 mol % $ZrO_2$.

33. The glass laminate of claim 32, wherein the at least one fining agent comprises at least one of up to 0.7 mol % $SnO_2$, and up to 0.5 mol % $Sb_2O_3$.

34. The glass laminate of claim 32, wherein the total amount of MgO, CaO, and SrO in the glass is less than or equal to 0.2 mol %.

35. The glass laminate of claim 32, wherein the glass comprises: from 55 mol % to 72 mol % $SiO_2$; from greater than 0 mol % to 16 mol % $Al_2O_3$; from 8 mol % to 35 mol % $B_2O_3$; from 3 mol % to 20 mol % $P_2O_5$; up to 5 mol % MgO; up to 0.2 mol % CaO; up to 0.2 mol % SrO; up to 0.2 mol % $SnO_2$; and up to 0.1 mol % $ZrO_2$.

36. The glass laminate of claim 30, wherein the clad glass is substantially free of alkaline earth modifiers.

37. The glass laminate of claim 30, wherein the clad glass is under a compressive stress of at least 100 MPa.

38. The glass laminate of claim 37, wherein the clad glass is under a compressive stress of at least 100 MPa.

39. The glass laminate of claim 30, wherein the core glass comprises an alkali aluminosilicate glass.

40. A method of making a glass, the method comprising:
a. providing a glass melt, the glass melt comprising from 50 mol % to 75 mol % $SiO_2$, from greater than 0 mol % to 35 mol % $B_2O_3$, from greater than 0 mol % to 20 mol % $Al_2O_3$, and from 3 mol % to 20 mol % $P_2O_5$, wherein the glass comprises at least one fining agent, the at least one fining agent comprising at least one of $SnO_2$, $CeO_2$, $Sb_2O_3$, and $Cl^-$; and the glass melt is substantially free of alkali metal modifiers; and
b. down-drawing the glass melt to form the glass.

41. The method of claim 40, wherein down-drawing the glass melt comprises fusion-drawing the glass melt.

42. The method of claim 41, wherein the glass melt is a clad glass melt, and wherein the method further comprises:
a. providing a core glass melt;
b. fusion-drawing the core glass melt to form a core glass; and
c. fusion-drawing the clad glass melt to form a clad layer glass surrounding the core glass, wherein the core glass has a coefficient of thermal expansion that is greater than that of the clad glass.

43. The method of claim 42, wherein the clad layer is under a room temperature compressive stress of at least 100 MPa.

44. The method of claim 40, wherein the glass has a coefficient of thermal expansion of less than $38 \times 10^{-7}/°$ C. averaged over a temperature range from 20° C. to 300° C.

45. The method of claim 44, wherein the coefficient of thermal expansion is less than $20 \times 10^{-7}/°$ C. averaged over a temperature range from 20° C. to 300° C.

46. The method of claim 44, wherein the glass further comprises: up to 0.5 mol % $Fe_2O_3$; up to 0.5 mol % $SnO_2$; up to 0.5 mol % $As_2O_3$; up to 0.5 mol % $Sb_2O_3$; and up to 0.1 mol % $ZrO_2$.

47. The method of claim 46, wherein the glass comprises: from 55 mol % to 72 mol % $SiO_2$; from greater than 0 mol % to 16 mol % $Al_2O_3$; from 8 mol % to 35 mol % $B_2O_3$; from 3 mol % to 20 mol % $P_2O_5$; up to 5 mol % MgO; up to 0.2 mol % CaO; up to 0.2 mol % SrO; up to 0.2 mol % $SnO_2$; and up to 0.1 mol % $ZrO_2$.

48. The method of claim 46, wherein the total amount of MgO, CaO, and SrO in the glass is less than or equal to 0.2 mol %.

49. The method of claim 40, wherein the glass has a Young's modulus of less than 78 GPa.

50. The method of claim 49, wherein the Young's modulus is less than 60 GPa.

51. The method of claim 40, wherein the glass melt is substantially free of alkaline earth modifiers.

52. A glass, the glass comprising: from 50 mol % to 75 mol % $SiO_2$; from greater than 0 mol % to 20 mol % $Al_2O_3$; from greater than 0 mol % to 35 mol % $B_2O_3$; greater than 0 mol % to 20 mol % $P_2O_5$; and a total amount of MgO, CaO, and SrO of less than or equal to 0.2 mol %, wherein:
   the glass comprises at least one fining agent, the at least one fining agent comprising at least one of $SnO_2$, $CeO_2$, $Sb_2O_3$, and $Cl^-$; and
the glass is substantially free of alkali metal modifiers.

* * * * *

UNITED STATES PATENT AND TRADEMARK OFFICE
CERTIFICATE OF CORRECTION

PATENT NO. : 9,527,767 B2
APPLICATION NO. : 14/267086
DATED : December 27, 2016
INVENTOR(S) : Ellison et al.

Page 1 of 1

It is certified that error appears in the above-identified patent and that said Letters Patent is hereby corrected as shown below:

In the Claims

In Column 12, Line 5, Claim 1, delete "about" before 5 mol%

In Column 13, Line 18, Claim 22, delete "$_{SnO2}$" and insert --$SnO_2$--

Signed and Sealed this
Seventeenth Day of December, 2024

Derrick Brent
*Acting Director of the United States Patent and Trademark Office*